United States Patent [19]
Fioriti et al.

[11] 3,975,550
[45] Aug. 17, 1976

[54] PLASTICALLY DEFORMABLE READY-TO-USE BATTER

[75] Inventors: Joseph Anthony Fioriti, Hastings; John Joseph Mancuso, Astoria, both of N.Y.

[73] Assignee: General Foods Corporation, White Plains, N.Y.

[22] Filed: Aug. 7, 1974

[21] Appl. No.: 495,345

[52] U.S. Cl. .............................. 426/553; 426/327
[51] Int. Cl.² ......................................... A21D 10/04
[58] Field of Search .......... 426/153, 154, 155, 343; 426/550, 553

[56] References Cited
UNITED STATES PATENTS

| | | | |
|---|---|---|---|
| 3,620,763 | 11/1971 | Hans | 426/155 |
| 3,649,304 | 3/1972 | Fehr et al. | 426/553 |
| 3,697,283 | 10/1972 | Rogers et al. | 426/553 |
| 3,753,734 | 8/1973 | Kaplow et al. | 426/155 |
| 3,784,710 | 1/1974 | Earle et al. | 426/155 |

*Primary Examiner*—Raymond N. Jones
*Attorney, Agent, or Firm*—Thaddius J. Carvis; Bruno P. Struzzi; Daniel J. Donovan

[57] ABSTRACT

A batter composition which can be cold stored at temperatures below 32°F, removed from the cold storage and immediately plastically deformed, such as by expressing from an orificed container, to suitable shape or spooned in desired amounts for cooking. The use of polyunsaturated oils and low-freezing materials, such as low molecular weight alcohols and glycols, in combination with a sugar or sugar-dextrin mixture maintains the dough flowable at reduced temperatures. The batter can be employed to make a number of products such as pancakes, waffles, muffins, cookies, cakes, snack items and the like.

1 Claim, No Drawings

PLASTICALLY DEFORMABLE READY-TO-USE BATTER

BACKGROUND OF THE INVENTION

The present invention relates to a ready-to-use batter product which can be used directly from the freezer where it is stored to insure freshness.

There are presently known a wide variety of so-called instant or ready-to-use dough and batter preparations for use in home cooking. Unfortunately, most of these preparations generally require some additional processing step by the consumer—such as mixing, defrosting or the like. For example, pancake batters which are marketed in rigid frozen form require defrosting the entire package before use. At ordinary refrigerator temperatures, the batter has a limited storage life. Thus, once the batter is defrosted, it must be refrozen or consumed within a relatively short period of time or it will spoil. Products of this type require a great deal of planning to assure that the desired product is defrosted at the time when use is contemplated. Thus, if you do not take the package out of the freezer at night, you cannot have pancakes in the morning. On the other hand, if you do take the package out of the freezer at night you almost have to have pancakes.

Accordingly, it would be advantageous to have a batter-type product which could be stored indefinitely at freezer conditions and then used at will with no need for special treatment such as defrosting or further mixing. Additionally, there is a present need for a ready-to-use baking composition which makes it possible to use only a small portion of the composition at will and then conveniently store the remainder for extended periods of time.

SUMMARY OF THE INVENTION

Accordingly, it is an object of the present invention to provide a ready-to-use baking composition which provides a maximum degree of convenience in both storage and use.

It is another object of the present invention to provide a ready-to-use baking composition which can be stored for extended periods of time at temperatures below 32°F and then immediately expressed from an orificed container or spooned in desired quantities with no need for additional work such as mixing or defrosting.

It is yet another object of the present invention to provide a ready-to-use baking composition which permits storage in a home freezer for extended periods of time, immediate use of a portion of the baking composition and continued storage of the remainder in the freezer.

It is still a further object of the present invention to provide a versatile ready-to-use baking composition which can be readily formulated before packaging to provide a number of different end products from the same basic composition.

These and other objects are accomplished according to the present invention which provides a ready-to-use baking composition having a moisture content of from about 15% to about 45%, which comprises on a dry basis: from about 3% to about 15% egg; from about 5% to about 35% of polyunsaturated oil, from about 1% to about 10% of a water miscible liquid material having a freezing point below 0°F; from about 10% to about 25% of a sugar or sugar-dextrin mixture; from about 15% to about 65% flour or flour-starch mixture; an amount of leavening agent effective for leavening the product during cooking; and flavoring agents if desired. Additionally, fruits, nuts, meats or the like can be employed in desired proportion along with the ready-to-use baking composition.

DETAILED DESCRIPTION

The advantages of the present invention are secured because of the ability of the novel ready-to-use baking composition to be readily plastically deformed, such as by extruding from an orificed container or spooning at temperatures normally encountered in home freezers. This is accomplished in large part through the use of polyunsaturated oils and other liquid materials such as alcohols, preferably ethanol, propylene glycol and glycerol, which are miscible in water and liquid at temperatures about 0°F, and is facilitated to a greater degree by the addition of sugars or sugar-dextrin mixtures. It has been found that the compositions of the present invention are capable of plastic deformation at temperatures below 32°F, and provide a consistency in rheological properties which permits a desirable flowability at reduced temperatures while not causing the compositions to become excessively runny at more elevated temperatures.

Among the polyunsaturated oils which can be employed are safflower oil, sunflower oil, soy bean oil, corn oil, wheat germ oil and blends of these materials. Preferably, the ratio of polyunsaturated fats to saturated fats in these oils should be greater than about 3, most preferably greater than about 6. The oil or blend should contain no more than 30% solids, as measured by pulse NMR, after storage for four weeks at 0°F. Safflower oil or blends containing a major proportion of safflower oil are preferred. A proportion of an oil low in polyunsaturates can be employed so long as the blend remains high in polyunsaturates and does not contain excessive solids at freezer conditions.

The sugar or sugar-dextrin mixture employed according to the present invention are selected from those which will not crystallize upon cooling to temperatures below 32°F, and preferably below 0°F at the moisture levels involved. Typically, these materials are employed as mixtures of pure sugars such as dextrose and sucrose, or mixtures of these with sugar polymers as found in hydrolyzed cereal solids such as those from corn starch, e.g. corn dextrin (1-13DE), malto-dextrin (13-23DE), and corn syrup (28+DE). A preferred sugar-dextrin syrup is a blend containing sucrose and corn syrup. Typically, the useful starch hydrolyrates will have DE values of from about 10 to about 42. The sugar or sugar-dextrin mixture should be employed in an amount sufficient to supply from about 10% to about 25% solids based on the dry weight of the ready-to-use dough composition.

It is also important to the present invention, to employ various other water miscible liquid materials which remain in the liquid state at the low temperatures, e.g. 0°F, contemplated by the present invention to enhance the flowability of the ready-to-use baking compositions of the present invention. Typical of the liquid materials which can be employed are edible low molecular weight alcohols, glycols and polyols, such as ethyl alcohol, 1,2-propylene glycol and glycerol. Glycerol and ethanol are found to be quite suitable for this purpose when used in amounts of from about 1% to about 10%, preferably from about 4% to about 8% based upon the dry weight of the composition. The use of these liquid materials is especially important where the solids content, e.g. flour, sugar, baking powder, egg solids, are toward the upper limits of the specified ranges, and where the oil employed is one having a relatively high solids content at the desired cold storage temperature.

The egg component is essential to the composition of the present invention to impart its normal functionality required in products of this type. Any source of functional egg material is satisfactory. For example, dry whole or egg white solids may be employed as well as fresh whole eggs or whites. Where fresh eggs are employed, the water content of the eggs is taken into account to arrive at the proper final moisture content of the composition. As a guide, it can be estimated that approximately 28% of fresh eggs is solids, the rest being water. Where dry egg solids are employed, care should be taken to select only highly functional solids. Egg solids which have lost excessive functionality will affect not only the rheological properties of the composition of the present invention, but also the properties of the final product after cooking. Typically from about 3% to about 15% egg solids, preferably from about 6% to about 12% are employed in the composition of the invention.

The composition must also contain a flour component, such as soft or hard wheat flour, oat flour, rice flour, bran flour, corn flour, or the like. It has been found that hard wheat flour is preferable in providing a plastically deformable batter at temperatures below 32°F. If desired, however, a blend of any of these, with up to about 50% of an additional starch component can be employed. The flour should be employed in an amount of from about 15% to about 65%, preferably about 25% to about 50%, based upon the weight of the dry ingredients.

Further essential to the present invention is the presence of a leavening agent such a baking powder. The importance of the leavening agent relates to the final properties of the composition after cooking but does not have a significant effect on the composition in its frozen or cold storage state. Conventional forms of baking powder can be employed as there is nothing presently believed critical to the particular type employed. It is noted however, that certain forms of leavening agents remain more stable under conditions of prolonged storage in moist conditions and at varying pH's than others. Those skilled in the art will readily be able to select the most suitable form of leavening agent for a particular formulation. Baking powder sold under the Calumet brand name has been found to be effective.

The composition of the present invention is prepared by mixing the ingredients in conventional manner to form a smooth batter. Typically, the desired amount of water to make up a moisture content of the total composition to from about 15% to about 25%, preferably about 20%, is added along with the eggs, oil and other ingredients except for the flour. These materials are mixed together and the flour is slowly folded into this mixture. Upon completion of the addition of the flour, the mixture is then vigorously mixed for a period of time sufficiently to remove all lumps therefrom. Preferably, the composition in this form is placed into a squeezable container having flexible walls and an orifice therein for expressing the contents. Alternatively, it can be placed in a container shaped to allow spooning out of the composition in desired amounts. The material thus packaged can be frozen for shipment and storage at temperatures below 32°F. For shipment and storage before purchase by the consumer, the extent to which the temperature is lower than 32°F is not important. However, for proper flow properties, the composition should be stored in an ordinary home type refrigerator freezer at a temperature of from about 0°F. to about 25°F.

To use the composition it is necessary only to remove the container directly from the freezer and squeeze or spoon out the desired portion into a baking or frying pan depending upon the particular type of product being prepared. By the variation of the standard ingredients, a wide variety of tastes and textures can be applied to the composition. For example by replacing sweet sugars with a predominant portion of non-sweet dextrins, a biscuit type product will result which can be employed with meat, cheeses or the like as hors d'oeuvres or snacks. On the other hand, where a sweet product is desired sucrose or other sweet sugars are employed to produce products such as pancakes or cookies. The products are cooked in conventional manner. In addition to the ingredients necessary for providing the desired rheological properties of the composition, other additives in the form of nuts, chocolate chips, meat, fresh fruit, and the like can be added to these compositions. Additionally, various flavoring materials and spices can be employed.

The following examples are presented for the purpose of further explaining and illustrating the present invention and are not to be taken as limiting in any regard. Unless otherwise indicated, all parts and percentages are by weight.

EXAMPLE I

A series of compositions according to the present invention are prepared and evaluated for their abilities to be plastically deformed at reduced temperatures and to provide desirable end products. In all cases the compositions are prepared for the purpose of making cookies. A control sample having the following formulation, with a total water content of about 30%, is prepared:

TABLE I

| Ingredient | Amount (grams) | Dry Wt. (grams) | % Dry Wt. |
|---|---|---|---|
| Fresh eggs | 330 | 86 | 10.4 |
| Safflower oil | 210 | 210 | 25.4 |
| Corn syryp (40 DE) | 228 | 161 | 19.5 |
| Vanilla extract (35% ethanol) | 8 | 4 | 0.5 |
| Baking powder (Calumet brand) | 12 | 12 | 1.5 |
| Flour | 400 | 352 | 42.7 |
| | 1188 | 825 | 100.0 |

To prepare this formulation, six eggs are broken and placed in a large Mixmaster mixer bowl and eight ounces of safflower oil is mixed therewith at slow speed. The sugar syrup, vanilla extract and baking powder are then blended with the oil and the eggs. To this blend, 400 grams of flour is added and slowly folded into the mixer over a period of about 5 minutes. Upon completion of the addition of the flour, the mixture is blended at high speed for from about 2 to 3 minutes.

This composition is then separated into 2 portions and stored in flexible walled containers; one portion at 15°F and another at 0°F. After 45 days storage under these conditions, the control formulation is tested and compared to the other formulations listed in Table II. The results are summarized in Table II. These other formulations are similar to that in Table I except for the substitution: in series I of the ingredients listed for the sucrose-corn syrup mixture; in series II, powdered whole eggs for fresh whole eggs; in series III, soft wheat flour for the all purpose, hard wheat flour; in series IV, the corn oil and corn oil-glycerol blend are substituted for the safflower oil; and in series V, the vanilla extract, which contains about 35% alcohol is eliminated.

In the table an E for a particular test indicates that the sample is easily extrudable from a one inch diameter orifice in one end of the flexible wall container. The values in lbs. provide an objective comparison of the consistency and deformability of the composition at the indicated temperatures. These numbers are obtained using a Chatillon Tension and Compression Tester Model UTSM employing guage DPP-50 and compressing at the maximum rate for the device. For those listed under column A a ½ inch plunger is employed and for those listed under column B a 2 inch plunger is employed. As a point of comparison, cream cheese at ordinary refrigerator temperature (e.g. 41°F) would give a reading of 1.5 pounds with the ½ inch plunger and 19 pounds with the 2 inch plunger.

TABLE II

| Sample Code & Description | | A 0°F (−17°C) | B 15°F (−10°C) |
|---|---|---|---|
| I a. | Corn syrup, 40 DE (control) (70% solids) | 2.5 lbs E | 3.2 lbs E |
| b. | 80/20 sucrose-dextrose sugar mixture (70% solids) | 1.5 lbs E | 2.6 lbs E |
| c. | 5 DE MOR-REX hydrolyzed cereal solids (70% solids) | 13.5 lbs | 7.2 lbs |
| d. | Sucrose (70% solids) | 3.0 lbs E | 9.0 lbs E |
| II. | Powdered whole eggs (with make up water) | 4.0 lbs E | 5.0 lbs E |
| III. | Cake (soft wheat) flour | 4.5 lbs | 8.5 lbs |
| IVa. | Corn oil | 9.5 lbs | 6 lbs E |
| b. | Corn oil + 4% glycerol | 2.5 lbs E | 2.8 lbs E |
| V. | Control minus vanilla extract (35% alcohol) | 5 lbs | 16 lbs |

EXAMPLE II

To further illustrate the present invention, the following four compositions, shown in Table III, are prepared:

TABLE III

| Ingredient | Sample (wt% total/wt% dry) | | | |
|---|---|---|---|---|
| | A | B | C | D |
| All purpose flour (12% H₂O) | 25.1/34.5 | 25.1 | 25.1 | 25.1 |
| Liquid whole eggs (72% H₂O) | 21.8/9.5 | 21.8 | 21.8 | 21.8 |
| Sucrose | 10.2/15.9 | 10.2 | 10.2 | 10.2 |
| Dextrose | 10.1/15.8 | 10.1 | 10.1 | 10.1 |
| Safflower oil | 14.3/22.3 | 14.3 | 14.3 | 14.3 |
| Water | 17.2/0 | 11.2 | 14.7 | 8.7 |
| Glycerol | X | 6.0 | X | 6.0 |
| Vanilla extract | X | X | 2.5 | 2.5 |
| Baking powder | 1.3/2.0 | 1.3 | 1.3 | 1.3 |
| | 100/100 | 100.0 | 100.0 | 100.0 |

Note that sample A has neither glycerol nor ethanol, while B has glycerol, C has ethanol, and D has both. To prepare the samples, all the solid ingredients are blended together and this blend is then combined and blended with all the liquid ingredients. The combined blend is than mixed in a Hobart mixer bowl and mixed to obtain a smooth batter. Each sample is then split into two portions, one placed in an open tub-like container and the other in a flexible-walled container having a one inch diameter orifice therein. The samples are stored for 4 days at 0°F and tested by spooning and extruding. The results are summarized below in Table IV.

TABLE IV

| Sample | Spoonable | Extrudable |
|---|---|---|
| A | No | No. |
| B | Yes | Yes |
| C | Yes | No |
| D | Yes | Yes |

EXAMPLE III

A further composition according to the present invention, having a moisture content of about 28%, is prepared having the formulation set forth in Table V.

TABLE V

| Ingredient | Weight % Total | Dry |
|---|---|---|
| All purpose flour (12% H₂O) | 25.1 | 31.0 |
| Liquid whole eggs (72% H₂O) | 21.8 | 8.6 |
| Sucrose | 20.3 | 28.4 |
| Corn oil | 14.3 | 20.0 |
| Water | 8.7 | — |
| Glycerol | 6.0 | 8.4 |
| Vanilla extract (50% H₂O, 35% EtOH) | 2.5 | 1.8 |
| Baking powder | 1.3 | 1.8 |
| | 100.0 | 100.0 |

All the solid ingredients are blended together and this blend is then combined and blended with all the liquid ingredients. The combined blend is then mixed in a Hobart mixer bowl and mixed to obtain a smooth batter. This batter can be extruded directly from a flexible container into baking cups and baked for 30 minutes at 350°F to prepare cup cakes or it can be placed directly on cookie sheets to prepare cookies.

EXAMPLE IV

A further composition according to the present invention, having a water content of about 28%, is prepared according to the procedure of Example III but this time having the formulation set forth in Table VI.

TABLE VI

| Ingredient | Weight % Total | Dry |
|---|---|---|
| All purpose flour (12% H₂O) | 26.0 | 31.8 |
| Liquid whole eggs (72% H₂O) | 22.0 | 8.5 |
| Corn oil | 15.0 | 20.8 |
| Water | 9.0 | — |
| Glycerol | 6.0 | 8.3 |
| Baking powder | 1.3 | 1.8 |
| Maltrin No. 10 | 19.7 | 27.4 |
| Salt | 1.0 | 1.4 |
| | 100.0 | 100.0 |

This composition is extruded and cooked in the same manner as that in Example III, but the product is non-sweet and biscuit-like. It is suitable for use with inlay of ham, tuna, chicken, chopped liver, salmon, smoked fish, and the like.

EXAMPLE V

A further composition according to the present invention, having a moisture content of about 29%, is prepared having the composition set forth in Table VII:

TABLE VII

| Ingredients | Weight % Total | Dry |
|---|---|---|
| Light Corn Syrup (Karo brand - 40 DE, 70% solids) | 29.0 | 28.5 |
| All purpose flour (12% $H_2O$) | 26.1 | 32.2 |
| Liquid whole eggs (72% $H_2O$) | 21.8 | 8.6 |
| Corn oil | 14.3 | 20.1 |
| Glycerol | 5.0 | 7.0 |
| Vanilla extract (50% $H_2O$, 35% EtOH) | 2.5 | 1.8 |
| Baking powder | 1.3 | 1.8 |
| | 100.0 | 100.0 |

This batter is prepared in the same manner as in Example III, but in this case, inlay materials are folded into the composition prior to packaging. The inlay formulations are as set forth in Table VIII.

TABLE VIII

| | Weight % Total Composition |
|---|---|
| Blueberry | |
| Batter | 87.5 |
| Frozen Blueberries | 12.5 |
| | 100.0 |
| Chocolate | |
| Batter | 80.0 |
| Chocolate Chips | 20.0 |
| | 100.0 |

After cold storage, these compositions are extruded directly into baking cups and baked at about 350°F for about 30 minutes to provide muffins.

Many modifications and variations of the present invention will be apparent to those skilled in the art upon reading the above disclosure. It is contemplated that all such modifications and variations be included within the scope of the present invention which is defined by the following claims.

What is claimed:

1. A plastically deformable ready-to-use batter composition susceptible to spoilage in the absence of freezer storage, said composition being at a temperature of below 32°F, having a moisture content of from about 15% to about 45%, which maintains plastic deformability at temperatures as low as 0°F, and which comprises on a dry basis:
   a. from about 3% to about 15% egg,
   b. from about 5% to about 35% of a polyunsaturated oil or oil blend,
   c. from about 1% to about 10% of a water miscible liquid material having a freezing point below 0°F, selected from the group of edible low molecular weight alcohols, glycols and polyols,
   d. from about 10% to about 25% of sugar or sugar-dextrin mixture,
   e. from about 15% to about 65% flour or a flour starch mixture, and
   f. an amount of leavening agent effective for leavening the product during cooking.

* * * * *